United States Patent
Wolframm et al.

(10) Patent No.: US 6,549,159 B1
(45) Date of Patent: Apr. 15, 2003

(54) ARRANGEMENT FOR THE INTERFEROMETRIC RADAR MEASUREMENT ACCORDING TO THE ROSAR PRINCIPLE

(75) Inventors: Aribert P. Wolframm, Landsberg (DE); Helmut Klausing, Wessling-Hochstadt (DE)

(73) Assignee: Astrium GmbH, München (DE)

( * ) Notice: Subject to any disclaimer, the term of this patent is extended or adjusted under 35 U.S.C. 154(b) by 0 days.

(21) Appl. No.: 09/889,758
(22) PCT Filed: Dec. 22, 1999
(86) PCT No.: PCT/DE99/04065
§ 371 (c)(1), (2), (4) Date: Jul. 20, 2001
(87) PCT Pub. No.: WO00/43807
PCT Pub. Date: Jul. 27, 2000

(30) Foreign Application Priority Data

Jan. 21, 1999 (DE) .......................... 199 02 008

(51) Int. Cl.⁷ .................. G01S 13/00; G01S 13/08
(52) U.S. Cl. ................... 342/25; 342/145; 342/158
(58) Field of Search ................... 342/25, 158, 145

(56) References Cited

U.S. PATENT DOCUMENTS

| | | | |
|---|---|---|---|
| 4,546,354 A | * | 10/1985 | Boles |
| 5,160,931 A | * | 11/1992 | Brown |
| 5,614,907 A | | 3/1997 | Kreitmair-Steck et al. |
| 5,659,318 A | * | 8/1997 | Madsen et al. ............... 342/25 |
| 6,166,677 A | * | 12/2000 | Kikuchi et al. ............... 342/25 |

FOREIGN PATENT DOCUMENTS

| | | |
|---|---|---|
| DE | 39 22 086 | 10/1990 |
| DE | 43 04 027 | 8/1994 |
| DE | 43 06 920 | 9/1994 |
| DE | 53 23 511 | 1/1995 |
| DE | 43 28 573 | 3/1995 |
| EP | 0 634 668 | 1/1995 |
| EP | 0 757 259 | 2/1997 |

OTHER PUBLICATIONS

Griffiths, H. (1995) "Interferometric Synthetic Aperture Radar", Electronics and Communication Engineering Journal, GB, Institution of Electrical Engineers, London, vol. 7, pp. 247–256.

* cited by examiner

*Primary Examiner*—Stephen C. Buczinski
(74) *Attorney, Agent, or Firm*—Collard & Roe, P.C.

(57) ABSTRACT

In conjunction with an arrangement for the interferometric radar measurement in connection with a radar system operating according to the ROSAR principle, comprising one coherent transmitting antenna and two coherent receiving antennas and their receiving channels, in connection with which the difference in the path between the two distances of the antennas and the measured points of impact is calculated by the wavelength λ of the emitted radar signal and the measured phase difference of the receiving echo of the two coherent receiving channels, it is proposed that the interferometric ROSAR system is integrated in or on a rotating device and positioned in such a way that each relevant area of the field to be measured can be detected.

9 Claims, 2 Drawing Sheets

ARRANGEMENT FOR THE INTERFEROMETRIC RADAR MEASUREMENT ACCORDING TO THE ROSAR PRINCIPLE

CROSS-REFERENCE TO RELATED APPLICATIONS

Applicants claim-priority under 35 U.S.C. §119 of German Application No. 199 02 008.6 filed Jan. 21, 1999. Applicants also claim priority under 35 U.S.C. §120 of PCT/DE99/04065 filed Dec. 22, 1999. The international application under PCT article 21(2) was not published in English.

BACKGROUND

The invention relates to an arrangement for the interferometric radar measurement based on the ROSAR principle, as defined in the introductory part of claim 1.

A radar method comprising a synthetic aperture based on rotating antennas (ROSAR) is known from DE 39 22 086.

A method for the interferometric radar measurement in conjunction with a helicopter radar system (Heli-Radar) operating according to the ROSAR principle is been made known by the application firm in DE 199 02 007, which holds the same position in time as the present application. Said method permits a quasi-three-dimensional representation of the radar image of terrain or other obstructions. The invention described in the following is based on said method.

A method for interferometric radar measurements with a synthetic aperture is admittedly known from GRIFFITHS, H., "Interferometric Synthetic Aperture Radar", Electronics and Communication Engineering Journal, GB, Institution of Electrical Engineers, London, Volume 7, No. 6, Dec. 1, 1995 (12-01-1995), pages 247 to 256, XP000545120; ISSN: 0954-0695). Said method, however, requires a radar platform that moves along a substantially linear track. A possibility for such radar measurements without a radar platform moving on its own cannot be realized in conjunction with said method. Furthermore, the corresponding processing algorithms of said method have to be adapted to the linear movement as well. The movement of the antenna is in this way given in a Cartesian system of coordinates. However, contrary to said method, in conjunction with the ROSAR method, processing algorithms are preset in a polar system of coordinates in accordance with the rotational motion of the antennas. This means that it is not possible to apply the processing algorithms of said prior art to ROSAR-systems.

SUMMARY

The problem, is solved with an arrangement for interferometric radar measurement having one coherent transmitting antenna for emitting a radar signal, and two coherent receiving antennas that receive a radar signal. The two conerent receiving antennas each have a receiving channel. The antennas are disposed on the Brotating arm of a rotating device. The difference in radar signal path distance between the two coherent receiving antennas and the measured points of impact is then calculated using the wavelength λ of said emitted radar signal and the measured phase of the receiving echo of the two coherent receiving channels. The arrangement is embodied as an interferometric ROSAR system, and positioned in such a way that each relevant area of the field to be measured can be detected. To obtain an image of the overall situation, ROSAR systems can form a data network when linked together.

Said problem is solved with the help of the measures specified in claim 1. Embodiments and advanced developments of the invention are specified in the dependent claims and explained in greater detail in the following description with the help of an exemplified embodiment. Said explanations are supplemented by the figures of the drawing, in which:

DETAILED DESCRIPTION

Defined system requirements have to be met for a modern taxi- and runway radar monitoring system. Such requirements have to be satisfied, for example as follows:

| | |
|---|---|
| Operating frequency | 16 GHz |
| Maximum range | 5500 m |
| Angle resolution in azimuth | 0.25° |
| Angle resolution in elevation | 2.0° |
| Distance resolution | 3 m |
| Antenna number of revolutions | 60 rpm |

However, it is necessary to point out that the radar system, for example for monitoring taxi- and runways, can be operated at other frequencies as well, in particular at even higher frequencies starting,with 20 GHZ and higher.

Now, in order to be able to satisfy the specified system requirements in accordance with the interferometric ROSAR principle, the calculations are based on the following statement:

The angle resolution in azimuth $\alpha_{AZ}$ achievable with the ROSAR method is computed according to DE 43 23 51 C1 based on the following equation:

$$\alpha_{AZ} = \frac{\lambda}{5 \cdot L \cdot \sin(\gamma/2)}. \tag{0.1}$$

With an opening angle of the real antenna in azimuth of γ=45° it is possible to compute the associated rotor length L at which the required angle resolution $\alpha_{AZ}$=0.25° is satisfied. The angle of γ=45° has to be viewed as an exemplified embodiment only and can be enlarged without any problem if any higher angle resolution is required. The associated rotor length L is computed based on the following equation:

$$L = \frac{\lambda}{5 \cdot \alpha_{AZ} \cdot \sin(\gamma/2)}. \tag{0.2}$$

With λ=C/fs0.01875 m; γ=45°, and $\alpha_{AZ}$=0:25°, it follows that the rotor length amounts to L=2.2465 meters. Said rotor length L is capable of rotating without problems at 1 r/s. If a second rotor arm (RAg) having an identical configuration in terms of radar is installed quasi as a counterweight, the rotation frequency can be halved, i.e. the rotation now takes place at a speed of 0.5 rps.

The angle resolution in elevation ϵ follows directly according to the principle of the real aperture based from the opening angle of the antenna of ϵ=2.00. The values γ=45° and ϵ=2.0° have to be understood to be 3 dB-values of the directional characteristic of the antenna, i.e. as the half-value width in terms of output. With the opening angles of the antenna in azimuth and elevation of γ=45° and ϵ=2.0°, it is possible to estimate the antenna measurements based on the general formula applied in antenna theory, notably $$\gamma \approx 70° \cdot \frac{\lambda}{D_{azimuth}} \quad (0.3)$$

and $$\varepsilon \approx 70° \cdot \frac{\lambda}{D_{elevation}}, \quad (0.4)$$

in order to make a final statement with respect to the mechanical dimension or stress. The following follows from equations (0.3) and (0.4):

$D_{azimuth}$=0.029 m, i.e. about 3 cm, and $D_{elevation}$=0.656 m, i.e. about 66 cm.

Figure 1:
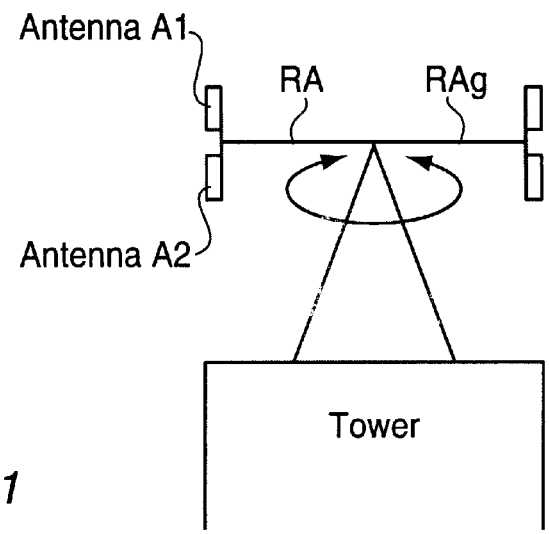
FIG. 1 is a schematic representation of an exemplified embodiment of the arrangement for the interferometric radar measurement comprising a second antenna carrier arm (Rag)
Figure 2:
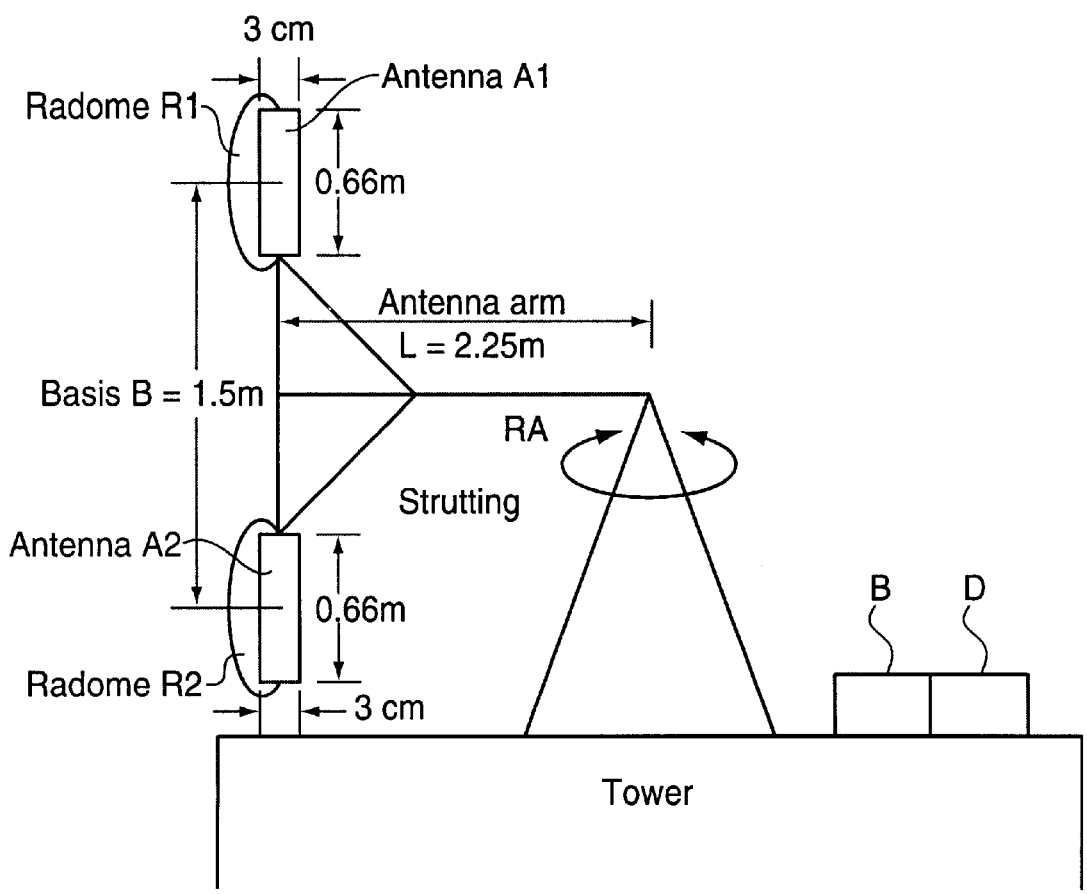
FIG. 2 is a schematic representation of an interferometric radar measuring system shown in greater detail, which is comprised of only one rotating antenna carrier arm (RA)

The antenna thus measures 3 cm×66 cm (azimuth× elevation) and is capable of rotating without problems with said proportions. According to FIGS. 1 and 2, the antennas themselves are protected also by corresponding radomes (R1, R2) and favorably influenced aerodynamically by such radomes.

In conjunction with the pulse radar employed in the present case, the resolution of the distance is computed by the compressed transmitting pulse duration τ and the speed of light C as follows:

$$\Delta R = \frac{C \cdot \tau}{2} \quad (0.5)$$

The required distance resolution ΔR of 3 m is satisfied with the compressed transmitting pulse duration of π=20 ns.

Now, in order to be able to detect and cover the entire area of the taxi- and runways of an airport, it will be necessary in most cases to position several radar devices or installations on the airport. Their arrangement in terms of location has to be selected in this conjunction in such a way that each relevant area of the airport can be monitored. Such an arrangement naturally will be airport-specific, i.e. it will be different from case to case. It is naturally understood that the information supplied by the radar system always has to be processed in such a way that a picture of the overall situation is obtained. So that the individual radar installations will not exert any influence on each other, provision is made that the transmitting frequencies around the respective transmission bandwidths are selected not in an overlapping, but rather in an offset manner.

Figure 3:
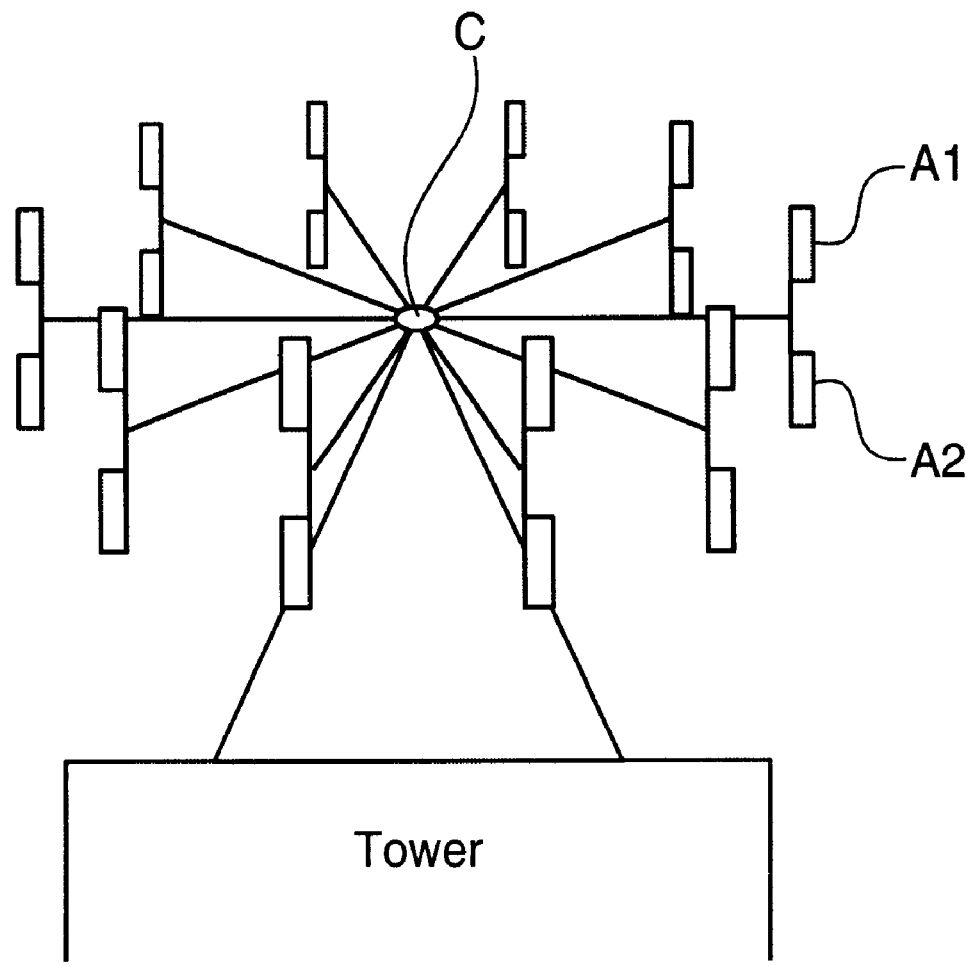
FIG. 3 is a schematic representation of an interferometric radar measuring system having a circular array of antennas.

The arrangement proposed herein for the interferometric radar measurement in conjunction with a radar system operating based on the ROSAR principle comprises one coherent transmitting antenna and two coherent receiving antennas A1, A2 with their receiving channels, which are integrated in or on a rotating arm RA of a rotating system and position in such a way that each relevant area of the field to be measured or monitored can be detected. Antennas A1, A2 are protected aerodynamically shaped radomes R1, R2. The rotating device can comprise a circular array of antennas A1, A2 with an electronic control C for the cyclic activation of areas of the array of antennas A1, A2 as shown in FIG. 3. Transmitting frequencies of individual interferometric radar insallations are offset in relation to each other by respective transmission bandwidths. The interferometric arrangement for radar measurement is linked with a radar arrangement B for detecting moving targets. An evaluation device D detects the direction and path of objects moving in a monitored area. Evaluation device D also determines the size and type of objects detected.

According to another embodiment of the invention, provision is made that a-second rotor arm (RAg) is installed. Said second rotor arm has an identical configuration in terms of radar and quasi represents a counterweight or imbalance compensation, which offers the benefit that the rotation frequency can be halved.

The present system is particularly important at airports because it assures optimal detection of fighting means after a military attack and detection of openly scattered, exposed ammunitions, bombs or other explosive devices, as well as detection of the damage caused after a military attack by measuring the altitude profile of the surface of the airport.

Another embodiment of the invention increases the possibilities for using and applying the system, notably by linking it with radar methods known per se for detecting moving targets. In this way, it is possible to detect all aircraft or land-based vehicles or marine vessels moving within the area of an airport to be monitored.

In case the system is operated at lower frequencies in the range of from 1 GHz to about 3 GHZ, it can be employed without any problems as an omnidirectional radar installation on airports, and as an omnidirectional radar installation in the medium ranges as well.

The proposed invention can be applied not only for monitoring airports and seaports, but for monitoring traffic junctions and other important sections of traffic lanes such as surface roads or railway installations as well.

Furthermore, it is possible to detect the direction and path of detected aircraft, ships, motor vehicles and other objects. Their path can be followed, so that a so-called driving track can be formed. The disposition of the path is thus dependent on the driving track, which can be exploited for traffic control systems or traffic disposition.

Furthermore, an object classification can be carried out, i.e. a distinction can be made on an airport, for example between aircraft, motor vehicles, tank trucks and follow-me vehicles. The same applies to the distinction of ships or other objects in general object monitoring operations.

What is claimed is:

1. An arrangement for interferometric radar measurement having a plurality of ROSAR systems linked together, each ROSAR system comprising:
   at least one coherent transmitting antenna for emitting a radar signal;
   at least two coherent receiving antennas that receive a radar signal;
   at least two receiving channels, one disposed on each receiving antenna; and
   a rotating device having a rotating arm upon which said at least one coherent transmitting antenna and said at least two coherent receiving antennas are integrated;

wherein a difference in radar signal path distance between said at least two coherent receiving antennas and measured points of impact is calculated using a wavelength λ of said emitted radar signal and a measured phase of a receiving echo of said two coherent receiving channels; and wherein the arrangement is embodied as an interferometric ROSAR system, and positioned in such a way that each relevant area of the field to be measured can be detected, wherein for obtaining an image of the overall situation, ROSAR systems form a data network when linked together.

2. The arrangement according to claim 1, further comprising at least one unit disposed on an end of said rotating arm and formed by one transmitting antenna and two receiving antennas.

3. The arrangement according to claim 1, wherein said rotating device comprises a circular array of antennas with an electronic control for the cyclic activation of areas of said array of antennas.

4. The arrangement according to claim 1, further comprising a second rotor arm having an identical configuration as said rotating arm in terms of radar, and connected to the rotating radar arm as a counterweight.

5. The arrangement according to claim 1, wherein said at least one transmitting antenna and said at least two receiving antennas are protected by aerodynamically favorably shaped radomes.

6. The arrangement according to claim 1, wherein transmitting frequencies of individual interferometric radar installations are offset in relation to each other by respective transmission bandwidths.

7. The arrangement according to claim 1, wherein the interferometric arrangement for radar measurement is linked with a radar arrangement for detecting moving targets.

8. The arrangement according to claim 1, further comprising an evaluation device for detecting the direction and path of objects moving in a monitored area.

9. The arrangement according to claim 1, further comprising an evaluation device for determining size and type of objects detected.

* * * * *